United States Patent [19]

Kanie et al.

[11] 3,877,009

[45] Apr. 8, 1975

[54] COLOR CHARACTER SIGNAL TRANSMISSION SYSTEM

[75] Inventors: Koichi Kanie; Toshiaki Sudoh, both of Tokyo, Japan

[73] Assignee: Nippon Electric Company, Limited, Tokyo, Japan

[22] Filed: Mar. 15, 1974

[21] Appl. No.: 451,656

[30] Foreign Application Priority Data

Mar. 15, 1973 Japan ............................... 48-30400

[52] U.S. Cl. ............... 340/324 AD; 358/12; 358/35

[51] Int. Cl. ............................................ G08b 5/36

[58] Field of Search .......... 340/324 AD; 358/12, 13, 358/14, 35

[56] References Cited

UNITED STATES PATENTS

| | | | |
|---|---|---|---|
| 2,715,156 | 8/1955 | Hammond | 358/35 |
| 3,368,029 | 2/1968 | MacDiarmid | 358/35 |
| 3,603,962 | 9/1971 | Lechner | 340/324 AD |
| 3,659,283 | 4/1972 | Ophir | 340/324 AD |
| 3,685,038 | 8/1972 | Flanagan | 340/324 AD |
| 3,771,155 | 11/1973 | Hayashi et al. | 340/324 AD |

*Primary Examiner*—David L. Trafton
*Attorney, Agent, or Firm*—Sughrue, Rothwell, Mion, Zinn & Macpeak

[57] ABSTRACT

A color character signal transmission system for a display control and a color display employed mainly in an electronic computer is disclosed. During an access time between the designation of an address in a character signal generator and the generation of a picture signal for a character to be displayed three time slots corresponding to the three primary colors, respectively, are serially provided for designating the color of the character. Each color is represented by the occurrence or non-occurrence of a pulse within a corresponding time slot. A synthesized color signal that contains color designating signals is transmitted through a first transmission path, while another synthesized signal containing the picture signal and horizontal and vertical synchronizing signals therefor is transmitted through a second transmission path.

1 Claim, 4 Drawing Figures

COLOR CHARACTER SIGNAL TRANSMISSION SYSTEM

BACKGROUND OF THE INVENTION

The present invention relates to a color character signal transmission system for linking a display control and a color display connected to an electronic computer.

Heretofore, transmission and reception of color signals have relied upon an NTSC system in which a subcarrier of 3.58 MHz is employed and color signal detection is carried out by means of phase detection, a RGB system in which color signal detection is carried out by individually transmitting the color component signals R, G and B, respectively, and the like. In case where the former system is applied to a character color display, the color signals must be superimposed on the respective luminance pulses forming the character. In the case of short distance transmission, the demodulation of the color signals involves practically no problem, but in the case of long distance transmission, the effect of noise is so large that accurate demodulation of the color signals becomes difficult. On the other hand, in case where the latter system is applied to a character color display, three separate transmission lines for the respective R-, G- and B- color component signals are required. Owing to the difference in the length of the transmission cables, there is likely to occur a phase shift between one color picture signal and another color picture signal, and consequently, this system has the disadvantage that adjustment of line length for phase registry is necessitated.

It is an object of the present invention to provide a novel color character signal transmission system which obviates the above-mentioned disadvantages inherent in conventional color character signal transmission systems, that is which permits signal transmission with little or substantially no phase shift, and which is simple in construction and requires a small number of transmission lines.

SUMMARY OF THE INVENTION

In general, in the color character signal transmission system to which the present invention is applied, the character data to be displayed are normally stored in a memory, whose contents are read out in succession. The read out data consist of a portion for designating an address in a character generator and another portion for designating a color for the corresponding character. Furthermore, in order to generate a picture signal, the output from the character generator which is generated in response to the designation of an address in the character generator is converted into a serial form, which forms the picture signal (For further details reference is made to a literature "DENSHI GIJUTSU (Electronics Technology)" (in Japanese) February 1972, pp. 124–126 "CRT Character Display and its Application" by Junji Yamato). The access time between the designation of an address and the formation of a picture signal, amount to about 600 ns.

According to one feature of the present invention, color signals are transmitted during the above-referred access time and thereafter the picture signal is transmitted.

DETAILED DESCRIPTION OF THE PREFERRED EMBODIMENT

Figure 1:
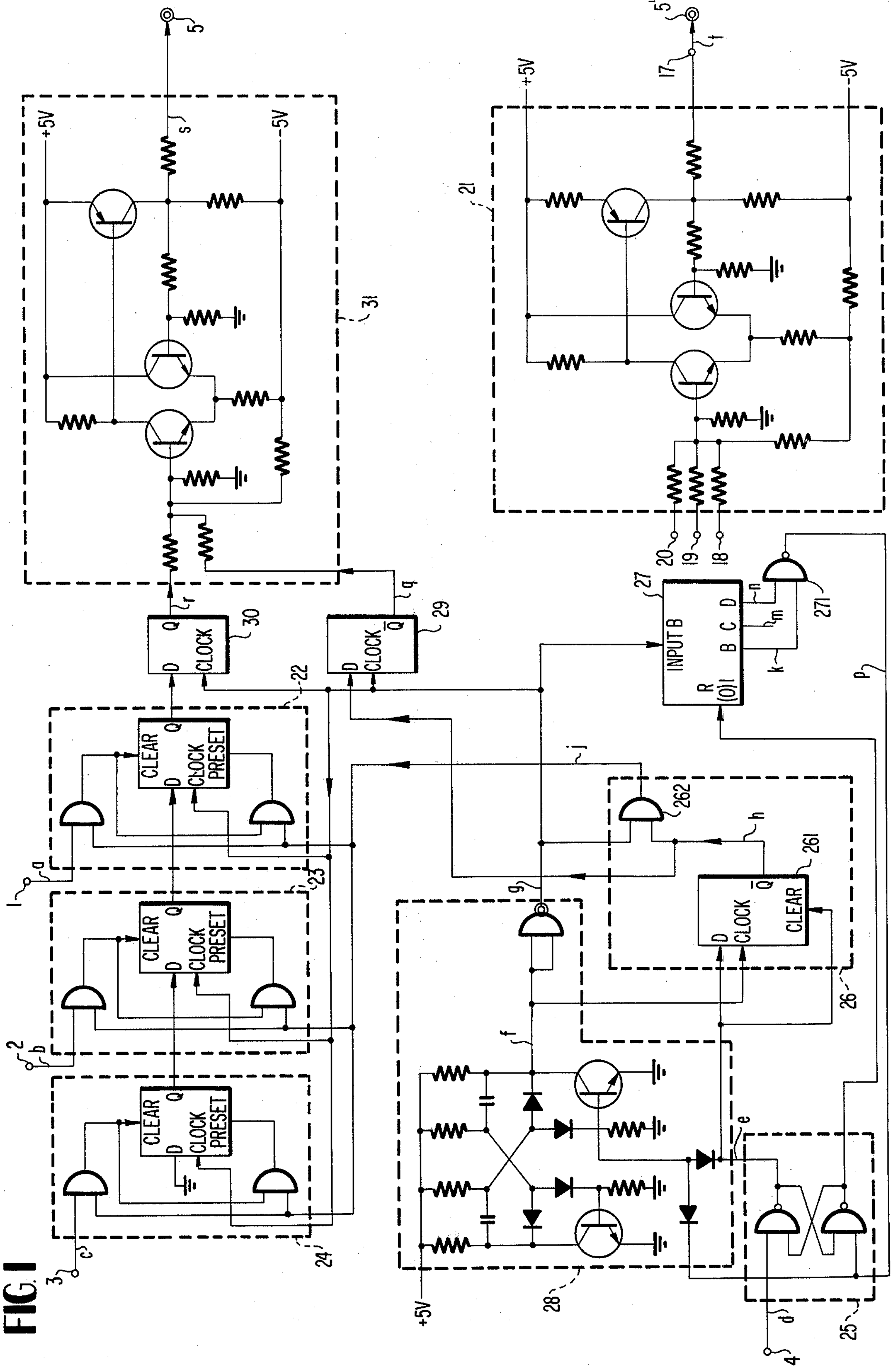
FIG. 1 is a schematic circuit diagram showing one preferred embodiment of a transmitter device in a color character signal transmission system according to the present invention.
Figure 2:
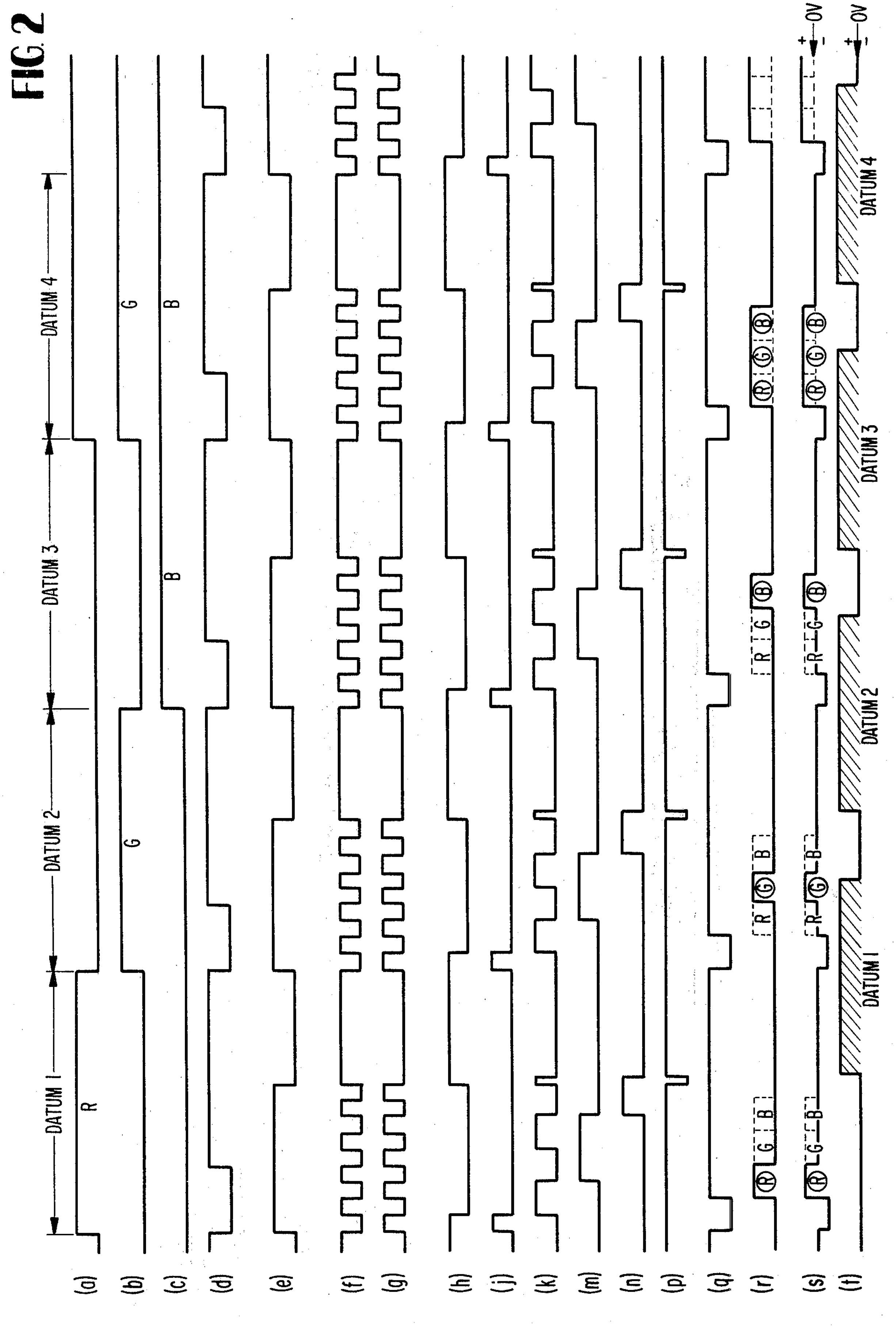
FIGS. 2(a) through (t) are waveform diagrams showing various signals appearing at the respective points in FIG. 1 represented by like reference characters.

At first, the construction and operation of the transmitter device will be described with reference to FIG. 1 and FIGS. 2(*a*) to 2(*t*).

In the waveform diagrams of FIGS. 2(*a*) to 2(*t*)[hereinafter referred to simply as (2-*a*) to (2-*t*)], it is assumed that the colors designated by datum 1 through datum 4 are red, green, blue and white, respectively. Reference characters given to the respective waveforms are inscribed at the corresponding locations in FIG. 1 where the respective waveforms appear. Waveforms (2-*a*) to (2-*c*), respectively, represent a primary R-color signal, a primary G-color signal and a primary B-color signal fed to the respective terminals 1, 2 and 3. The respective primary color signals correspond to the portion for designating colors of the output signal read out from a memory for storing character data. The primary R-color signal designates red (R), the primary G-color signal designates green (G), the primary B-color signal designates blue (B), and by employing these three primary color signals either singly or in combination it is possible to achieve color designation for seven colors in total (red, green, blue, magenta, cyanine, yellow and white). If red is designated for datum 1, then in the time interval allotted for datum 1, the respective color designation signals are signal (2-*a*) at a high level and signals (2-*b*) and (2-*c*) at a low level, and they are applied to the input terminals 1, 2 and 3, respectively. To an input terminal 4 is applied a character synchronizing signal (2-*d*) which basically serves to define the respective time interval for the characters. This signal (2-*d*) is applied to a flip-flop 25, and its output (2-*e*) becomes high. A non-stable multivibrator 28 begins to oscillate in response to the high level output (2-*e*). The oscillation output (2-*f*) of the multi-vibrator 28 and its inverted signal (2-*g*) are applied to a set pulse generator 26 for the primary color signals. A flip-flop 261 receives the signal (2-*f*) at its clock input and the signal (2-*e*) at its D-input and clear input to provide an output signal as shown at (2-*h*). A logical product of the signals (2-*h*) and (2-*g*) is generated via an AND gate 262 to provide a primary color signal set pulse (2-*j*). This set pulse (2-*j*) is applied to the respective R-, G- and B- registers 22 – 24 as one input thereto to either preset or clear the D-type flip-flops used in the respective primary R-, G- and B- registers 22 through 24 according to their input levels to thereby provide a the flip-flop 30 with a combined color signal and a flip-flop 29 with a character synchronizing signal. In this way, in case of datum 1, only the Q-output of the R-, register 22 is at a high level. By connecting the individual R-, G- and B-registers 22. 23 amd 24 as shown in FIG. 1, an R-G-B shift register is constructed. The data stored in this R-G-B shift register is shifted by the pulses in the signal (2-*g*).

The pulses in the signal (2-*g*) are applied to a shift pulse counter 27 (for example, SN7493 manufactured by Texas Instruments Inc. is available) which has a binary coded decimal (BCD) output represented by the signals (2-*h*), (2-*m*) and (2-*n*). At a count of five, (2-*k*) and (2-*n*) are at high levels thereby producing the negative pulse shown at (2-*p*). The latter pulse stops multivibrator 28 from oscillating. Here it is to be noted that although a waveform of a "count-2" output signal (2-m) at the terminal C of the counter 27 is illustrated in FIG. 2, this output signal is not used in the circuit operation described in this embodiment. The output signals from the R-G-B shift register 22–24 are applied to the D-input of the flip-flop 30 generating the combined color signal (2-*r*) at the Q-input thereof. On the other hand, the output signal (2-*h*) from the flip-flop 261 is applied to the D-input of the flip-flop 29 generating the character synchronizing signal (2-*q*) at the $\overline{Q}$-output thereof.

The signals (2-*r*) and (2-*q*) are superposed on each other in a synthesizer 31 to provide at its output a first synthesized signal (2-*s*) of the combined color signal and the character synchronizing signal. This output signal is produced in the form such that the signal (2-*q*) is superposed on the negative side while the signal (2-*r*) is superposed on the positive side. In case of datum 1, the signal (2-*s*) is constructed in a such manner that immediately after the character synchronizing signal only the time slot allotted to the R-bit in the synthesized color signal may become high and the remaining time slots allotted to the G- and B-bits, respectively (shown by a dotted line in the waveform (2-*s*)), may become low. This signal (2-*s*) is transmitted from a transmitting terminal 5 through a first transmission path. In FIG. 2, datum 2 is assumed to designate the color of a character which is green, so that the signals (2-*a*), (2-*b*) and (2*c*) having the respective levels low, high and low are applied to the color designating inputs 1, 2 and 3. These input signals set the shift register 22 to 24 in the same way as that described above, and then the contents of the shift register are shifted by the signal (2-*g*) to provide the signal (2-*r*), which is synthesized with the signal (2-*q*) to form the synthesized signal (2-*s*), and thus the signal (2-*s*) is transmitted. This signal (2-*s*) is constructed in such a manner that in the synthesized color signal immediately after the character synchronizing signal only the time slot allotted to the G-bit may become high and the remaining time slots allotted to the R- and B-bits, respectively (shown by a dotted line in the waveform (2-*s*)), may become low. Also in FIG. 2, it is assumed that for datum 3 the color of the character is designated as blue and for datum 4 it is designated as white, and the respective waveforms (2-*a*) to (2-*t*) (to be explained later) are illustrated for those data. However, since the operations of the transmitter device for data 3 and 4 are similar to those described above for data 1 and 2, and since the operations are self-explanatory by reference to FIG. 1 and to the the waveforms in FIGS. 2(*a*) through 2(*t*), a further description of the operations of the transmitter device for data 3 and 4 will be omitted.

A picture signal, a horizontal synchronizing signal and a vertical synchronizing signal are applied to input terminals 18, 19 and 20, respectively, of a synthesizer 21 to produce at output terminal 17 a second synthesized signal, which is transmitted from a transmitting terminal 5' through a second transmission path. While this output signal is schematically shown as a waveform (2-*t*), in this waveform the horizontal and vertical synchronizing signals are omitted and only the picture signal is shown. It is to be noted that in this waveform the picture signal is superposed on the positive side while the horizontal and vertical synchronizing signals are superposed on the negative side.

In this way, the first and second synthesized signals shown at (2-*s*) and (2-*t*), respectively, are transmitted through two separate transmission paths.

Figure 3:
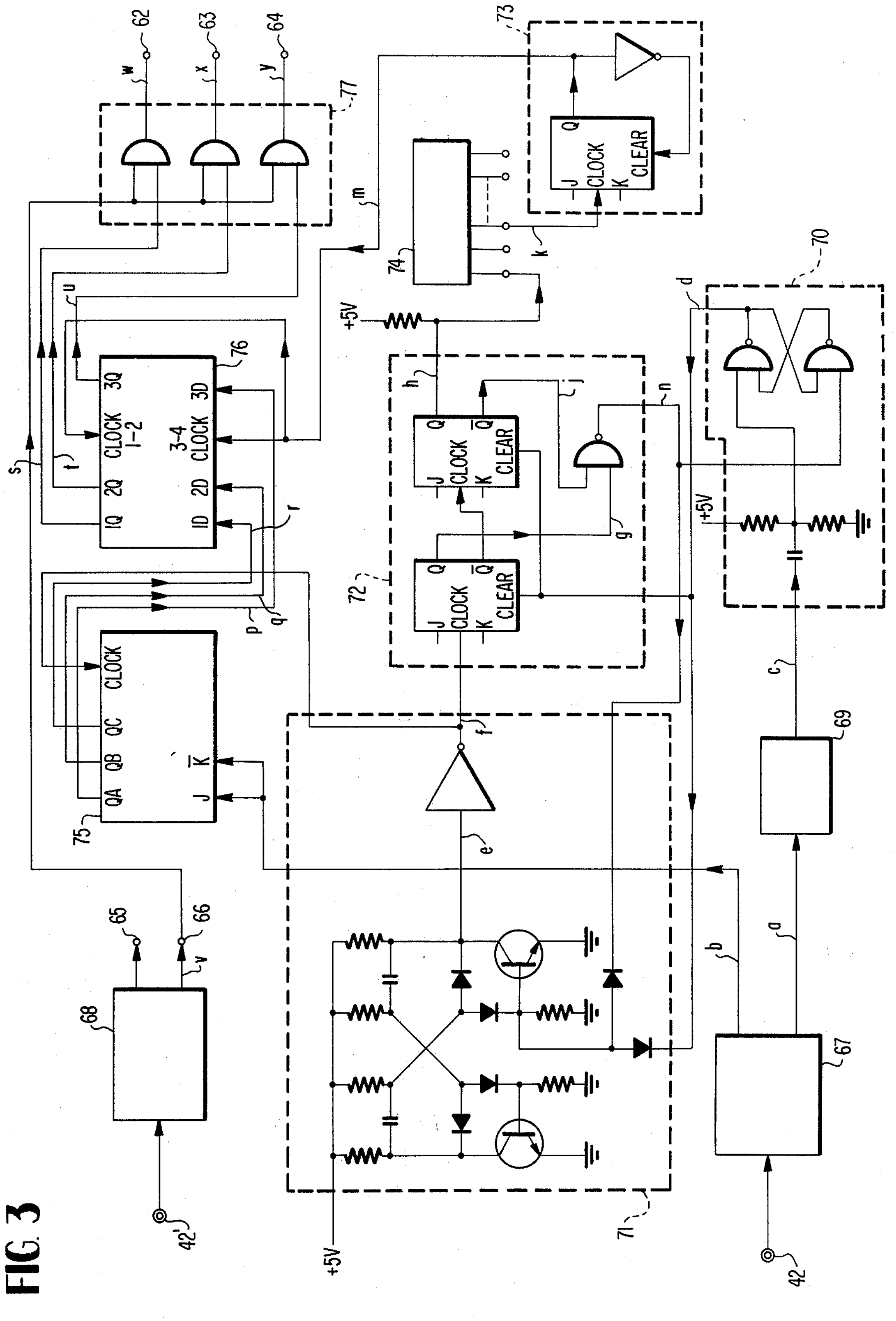
FIG. 3 is a schematic circuit diagram showing one preferred embodiment of a receiver device in a color character signal transmission system according to the present invention.
Figure 4:
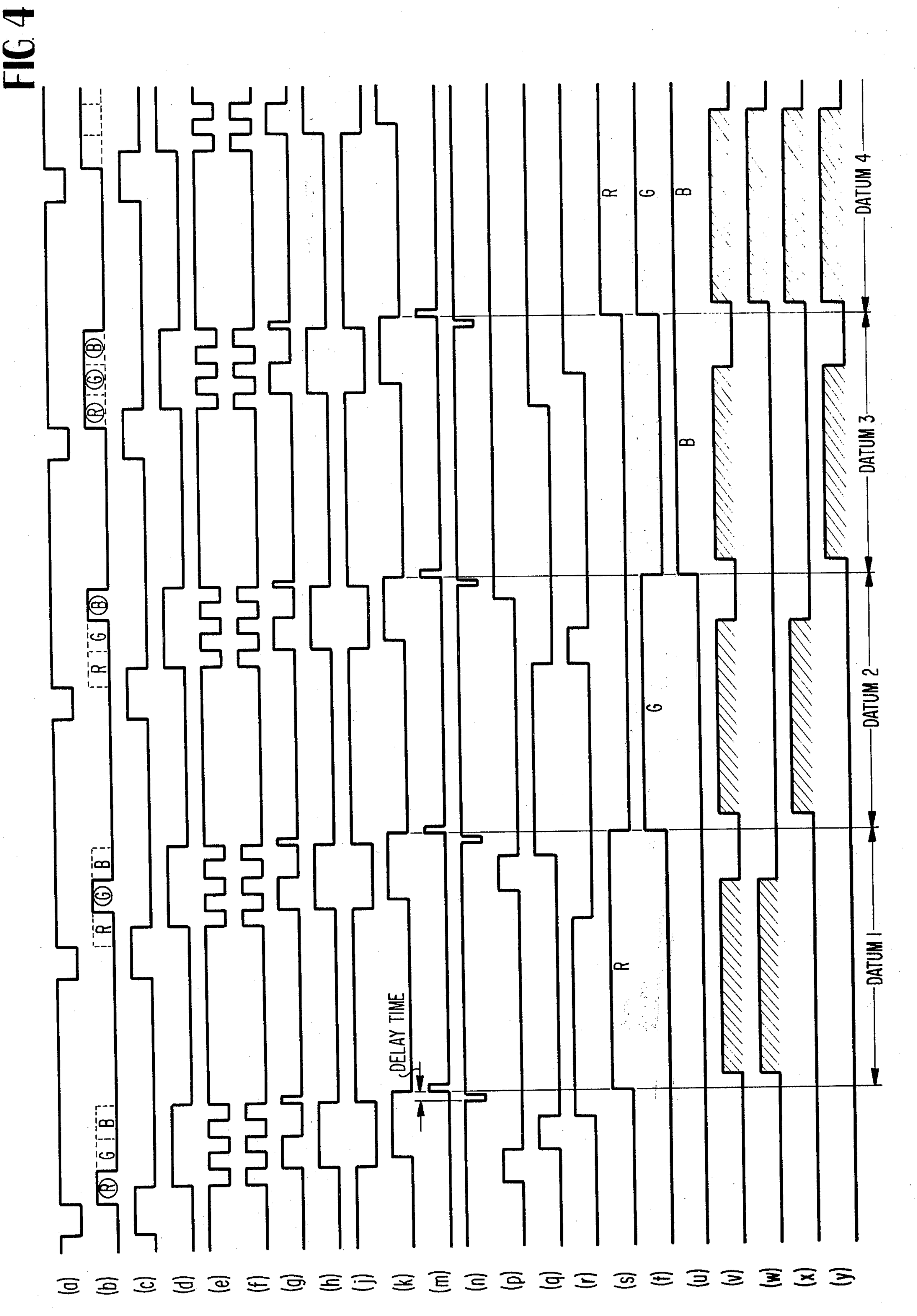
FIGS. 4(a) through (y) are waveform diagrams showing various signals appearing at the respective points in FIG. 3 represented by like reference characters.

Now the construction and operation of the receiver device will be described with reference to FIG. 3 and FIGS. 4(*a*) to 4(*y*) [hereinafter referred to simply as (4-*a*) to (4-*y*)]. It is assumed that the receiver device has received the above-described two signals (2-*s*) and (2-*t*) which were transmitted from the transmitter device as shown in FIG. 1 in response to the data 1 to 4 illustrated in FIG. 2(*a*). Reference characters given to the respective waveforms in FIG. 4 are inscribed at the corresponding locations in FIG. 3 where the respective waveforms appear.

The first synthesized signal (2-*s*) received at a receiving terminal 42 through the first transmission path is applied to an input of a separator 67 to be separated into a character synchronizing signal (4-*a*) and a combined color signal (4-*b*). The signal (4-*a*) is applied to a mono-stable multi-vibrator 69 to obtain a signal (4-*c*) at its output. The pulse width of this signal (4-*c*) is adjusted so that the trailing edge of the signal (4-*c*) may be positioned at the center of the time slot allotted to the R-bit in the signal (4-*b*). The signal (4-*c*) is applied to an input of a flip-flop 70, having a differentiation circuit at the input thereof, to actuate the flip-flop 70 by the trailing end of a differentiated signal thereby providing a signal (4-*d*) at its output.

In response to the signal (4-*d*), a non-stable multi-vibrator 71 starts oscillation. The oscillation output (4-*e*) of the multi-vibrator 71 is inverted into a signal (4-*f*) via an inverter and applied to an R-G-B shift register 75 (for example, SN74195 manufactured by Texas Instruments Inc. is available) for use as clock pulses therefor. A counter 72 also receives the signal (4-*f*) to count the number of the clock pulses. When the counter has counted by three, the oscillation of the multi-vibrator 71 is interrupted by a signal (4-*n*) which is a logical product of a "count-1" output (4-*g*) and a "count-2" output (4-*j*) obtained via a NAND gate.

On the other hand, the combined color signal (4-*b*) separated by the separator 67 is stored in the R-G-B shift register 75, which produces at its output terminals QC, QB and QA a sub-demodulated R-color signal (4-*r*), a sub-demodulated G-color signal (4-*q*) and a sub-demodulated B-color signal (4-*p*), respectively. In connection with datum 1, since the signal (4-*b*) is at a high level only, in the time slot allotted to the R-bit, the signals (4-*r*), (4-*q*) and (4-*p*) appearing at the respective outputs are at levels high, low and low, respectively.

The output signal (4-*h*) from the counter 72 is applied to the input of a delay line 74 to obtain a delayed signal (4-*k*) at its output. This delay line 74 is provided for the purpose of compensating for the difference in transmission path length between the two cables to be used as the first and second transmission paths. In accordance with the timing relation between the received combined color signal (4-*b*) and the received picture signal (4-*v*), one of the taps of the delay line 74 is selected so that the trailing edge of the signal (4-*k*) may come within the time region between the trailing edge of the signal (4-*h*) and the leading edge of the luminance signal in the picture signal waveform (4-*v*).

Receiving the signal (4-*k*), a set pulse generator 73 produces set pulses (4-*m*) at the trailing edge of the signal (4-*k*), which are applied to an R-G-B register 76 (for example, SN7475 manufactured by Texas Instruments Inc. is available) as its clock pulses. The R-G-B register 76 stores the signals (4-*r*), (4-*q*) and (4-*p*), and provides at its outputs 1Q, 2Q and 3Q a demodulated R-color signal (4-*s*), a demodulated G-color signal (4-*t*) and a demodulated B-color signal (4-*u*), respectively. In connection with datum 1, the signals (4-*s*), (4-*t*) and (4-*u*) appearing at the respective outputs of the R-G-B register 76 have high, low and low levels, respectively. These color signals are applied to the respective AND gates in a gate circuit 77.

On the other hand, the second synthesized signal (2-*t*) received at a receiving terminal 42' through the second transmission path is separated by a separator 68 into horizontal and vertical synchronizing signals and a picture signal (4-*v*) appearing at its output terminals 65 and 66, respectively. The picture signal (4-*v*) is applied to the gate circuit 77 as the other input to obtain its logical products with the respective demodulated R-, G- and B-color signals through AND gates, and the logical product output signals are provided at the terminals 62 to 64 as a R-picture signal (4-*w*), a G-picture signal (4-*x*) and a B-picture signal (4-*y*), respectively. In case of datum 1, only the R-picture signal (4-*w*) becomes high, but the remaining G- and B-picture signals become low. In case of datum 2, since the respective R-, G- and B-bits of the combined color signal are at the low, high and low levels, after a circuit operation similar to that described above only the G-picture signal becomes high, but the remaining R- and B-picture signals become low. Similarly, in case of datum 3, only the B-picture signal becomes high, but the R- and G-picture signals become low. In case of datum 4 which designates the color of a character as white, all the R-, G- and B-picture signals become high.

Thus by applying to the inputs of a conventional color display relying upon an RGB system four kinds of signals consisting of the horizontal/vertical synchronizing signal obtained at the output terminal 65 of the separator circuit 68, the R-picture signal (4-*w*), the G-picture signal (4-*x*) and the B-picture signal (4-*y*) obtainted at the output terminals 62 to 64, the color characters can be displayed.

The detailed circuits arrangements for the separator circuit 67 and 68 are well-known. For instance, reference may be made to "TEREBI JUZOKI NO KAIRO SEKKEI (Circuit Design for Television Receivers)" (in Japanese) by Sumio Soda published from RADIO GIJUTSU SHA p.p. 554–559, or "TELEVISION" by V. K. Zworykin et al published from JOHN WILEY & SONS, INC, pp. 584–594. Therefore a further explanation thereof will be omitted in this specification.

As will be obvious from the above description, according to the present invention, since the respective R-, G- and B-color signals are transmitted after having been combined as mentioned before, and since the demodulation of the received signal is achieved by storing the signal in a shift register, there exists substantially no mutual phase shift between the respective R-, G- and B-color signals. In addition, the subject system is little effected by the noise which would be introduced during transmission, and consequently, the problem of color deviation especially caused by the long distance transmission of color signals can be resolved by this system. The compensation for the difference in transmission path length between the two cables to be used as the first and second transmission paths can be achieved by properly selecting the tap connection of the delay line. However, there is no need to register the positions of the respective luminance pulses in the three picture signals which have been transmitted separately as is the case with a conventional RGB system, and therefore the color character signal transmission system according to the present invention is far easier in adjustment than any conventional system.

What is claimed is:

1. In a color character signal transmission system including character signal generator means responsive to address designation for generating a corresponding character signal and a character synchronizing signal, character data memory means for providing at its readout output an output signal containing a portion for designating an address in said character signal generator means and another portion for designating a color of a character corresponding to said character signal, and means responsive to said character signal and said another portion for color-displaying said character, wherein:

the transmitting side comprises:

means responsive to said another portion for generating a first synthesized signal of a combined color signal and said or reformed character synchronizing signal in access time between said address designation and color-display of said character, said combined color signal being time-serially arranged three-digit binary code designating the color of said character;

means for generating a second synthesized signal of horizontal and vertical synchronizing signals and a picture signal reproduced from said character signal; and means for transmitting said first and second synthesized signals through two transmission paths, respectively; and wherein the receiving side comprises:

means for regenerating said combined color signal and character synchronizing signal from the received first synthesized signal;

means for regenerating said horizontal and vertical synchronizing signals and said picture signal from the received second synthesized signal;

means responsive to the regenerated combined color signal and character synthronizing signal for generating three bit parallel binary code designating the color of the received picture signals;

and means for combining said parallel binary code and regenerated picture signal to apply the combined signal together with the horizontal and vertical synchronizing signals to said color-displaying means.

* * * * *

UNITED STATES PATENT OFFICE

CERTIFICATE OF CORRECTION

Patent No. 3,877,009 Dated April 8, 1975

Inventor(s) Koichi Kanie et al.

It is certified that error appears in the above-identified patent and that said Letters Patent are hereby corrected as shown below:

IN THE SPECIFICATION:

Column 1 - Line 39, after "that is" insert --,--

Line 60, delete "1972" and insert --1971--

Line 67, delete "BRIEF DESCRIPTION OF THE DRAWINGS" and insert below as a heading.

Column 2 - Line 64, after "provide a" delete "the"

Line 68, delete "22." and insert --22,--

Column 3 - Line 7, delete "(2-h)" and insert --(2-k)--

Line 17, delete "Q-input" and insert --Q-output--

Line 39, delete "(2c) and insert --(2-c)--

Column 4 - Line 36, delete "end" and insert --edge--

IN THE CLAIMS:

Column 6 - Line 57, delete "synthronizing" and insert --synchronizing--

Signed and Sealed this

*eighteenth* Day of *November 1975*

[SEAL]

*Attest:*

RUTH C. MASON
*Attesting Officer*

C. MARSHALL DANN
*Commissioner of Patents and Trademarks*